12/5/1967

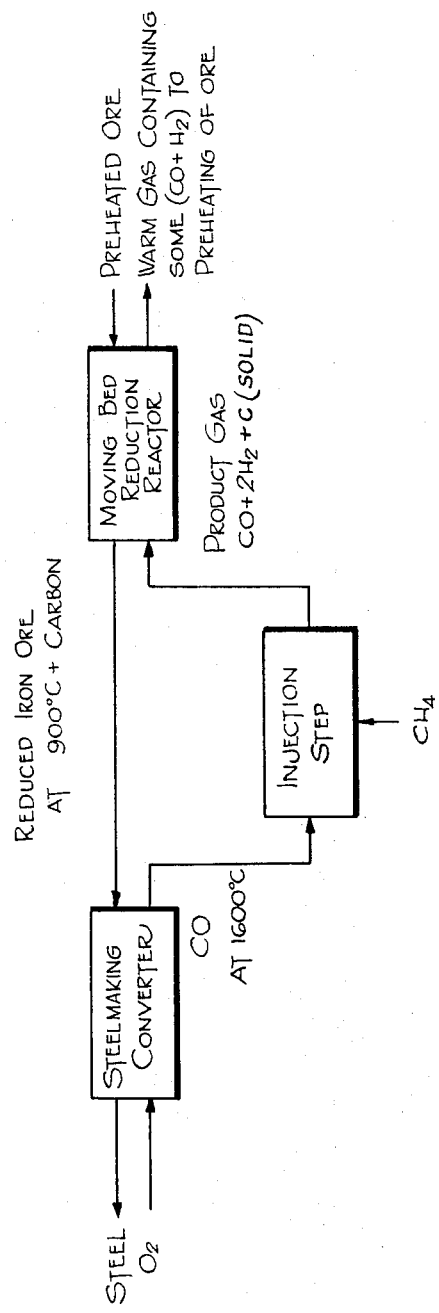

United States Patent Office 3,356,488
Patented Dec. 5, 1967

3,356,488
PROCESS FOR UTILIZING HYDROCARBON
INJECTION INTO HOT REDUCING GASES
IN STEELMAKING
John H. Walsh, Manotick, Ontario, Canada, assignor to Her Majesty The Queen in Right of Canada as represented by the Minister of Mines and Technical Surveys
Filed Feb. 23, 1965, Ser. No. 434,661
Claims priority, application Canada, Feb. 24, 1964,
896,376, Patent 752,792
19 Claims. (Cl. 75—34)

ABSTRACT OF THE DISCLOSURE

The invention includes the basic step of injecting into the exhaust gases issuing from an oxygen steelmaking converter, a hydrocarbon which results in cooling of the exhaust gases and appreciable dissociation of the injected hydrocarbon to form a reducing gas consisting largely of CO and $H_2$. This gas is passed through a bed of particulate iron oxide to achieve reduction thereof.

The present invention relates to a method of recovering, in an efficient manner, the energy in the gases leaving steelmaking vessels, particularly of the oxygen converter type. Further, the invention suggests ways in which these gases can be readily used in iron reduction processes and particularly to produce steel directly from high grade iron ore.

One of the major unsolved problems in the iron and steel industry has been the effective use of the gases issuing from oxygen using steelmaking processes, in particular those of the "L-D" or "Savard-Lee" types. These gases which vary somewhat in composition during the length of the steelmaking blow, are usually rich in CO and leave the vessel at temperatures of the order of 1600° C. Attempts have been made to use these hot gases issuing from the converter for various purposes, but steam-raising aside, these attempts, to date, have failed because of the high temperature of the gases and also because the volume of the gases is not sufficient to make their utilization in an iron reduction step attractive.

Another important problem of the steelmaking process is the removal of very fine iron oxide dust from the gases which results when oxygen reacts with liquid iron under the conditions existing during the steelmaking process.

In order to overcome the above-mentioned problems, efforts have been directed primarily to the purification of the issuing gases to the exclusion of other possibilities. In Canada and the United States, the practice has been to allow the gases leaving the steelmaking vessel to burn with air. The hot gases so produced are quenched, sometimes with the production of by-product steam, and the cooled gases are then purified in a complex series of steps normally involving filters and electro-static methods. In contrast, in France and Japan, recent installations have been made of devices which collect the gases from the converter without their oxidation by air. However, since the hot gases are cooled to room temperature in these collection systems, degradation of their available energy results without any use having been made thereof. It is apparent, therefore, that the principal purpose of these latter collection systems is not to recover the energy but to reduce the volume of the gases that need be passed through the dust purification system.

An efficient method has now been found for recovering the energy in the gases leaving steelmaking processes of the oxygen converter type and, as well, ways for using the gases in the iron reduction process. Applicant has found that it is possible to make steel in an oxygen converter directly from iron oxide and without the need for hot metal by the use of the process to be described. In addition, it is possible to provide a reduced-iron feed for the convention oxygen steelmaking process to augment the normal iron feed from scrap and hot metal. It is also possible, using this process, to produce a useful gas for general plant purposes, for example, for use in direct reduction kilns. Also, by the use of this process, valuable by-products, ethylene and associated compounds, can be produced. Further, the dust purification problem can be simplified by the use of this new technique.

The process of the present invention does not require a blast furnace and ancillary equipment which means a large saving in capital outlay to set up the steelmaking process. However, the process can be carried out in conjunction with existing steelmaking installations.

The process according to the present invention relates primarily to the addition or injection of hydrocarbons into the hot gases that issue from the converter. In essence, the high sensible heat of the converter gases is used to dissociate the hydrocarbons which may be, for instance, natural gas or naptha. By this method, it is possible to cool the issuing gases to the range of about 600° C. to 900° C. with appreciable dissociation of the injected hydrocarbon. The gas so produced will consist largely of CO, $H_2$, free carbon carried as a dust, iron oxide also carried as dust, and possibly a small quantity of ethylene and/or similar unsaturated hydrocarbons.

The present process also relates to techniques of efficiently utilizing the converter gases so treated with the injected hydrocarbon. The principal application is for the reduction of iron ore. These gases being very rich in reducing constituents have a high reduction potential, since the nitrogen, $CO_2$ and $H_2O$ contents are very low and because a smaller quantity of undissociated hydrocarbon will normally be present. Also, the gas (by controlling the proportion of injected hydrocarbons) can be adjusted in temperature to the preferred range for iron reduction. The iron reduction step may be carried out in a variety of ways involving moving beds, fluid beds, spouting beds of other techniques. However, the main application according to the present invention, is to pass the reducing gases, produced by the method already described, upwards through a moving bed of downward moving iron oxide to achieve reduction according to the counter-current principle. This moving bed may have special internal devices installed, for example, packing, to achieve good gas-solids content or, alternatively, may be charged with iron ore in a preferred form such as pellets or sinter. However, using the coarse specular hematite concentrate now becoming available from the Quebec-Labrador mining region, it is likely that no agglomeration step would be necessary for preparing this type of material for such a moving bed. It is also probable that no packing would be necessary to achieve good bed conditions; however, the addition of a small quantity of coke could be tolerated to remedy any deficiencies in this regard. It may be that the iron oxide fed to this moving bed should be pre-heated under oxidizing conditions; this can be easily achieved by using the gas recovered directly from the top of the moving bed with the combustion of its remaining combustible constituents together with its sensible heat. A minor amount of extra energy over and above that supplied by this gas might be necessary to achieve the proper degree of pre-heating, but no great quantity of energy should be required for this purpose. Any sulphur in the ore would be largely removed in this step. It may also be advantageous to add the limestone required for the subsequent steelmaking operation in the pre-heating and/or moving bed. Since it would probably be most convenient to have the gas pressure at the mouth of the converter at about one atmosphere pressure, the moving bed must operate at reduced pressure at its top to induce the reacted gases to flow up through the bed. These top gases and any unreacted hydrocarbon would then be used as fuel, to fire the pre-heating device which may be a rotary kiln, a fluid bed or other device including another moving bed. The fixed carbon produced by the dissociation resulting from the injection of the hydrocarbon into the hot converter gases should be held by the bed as completely as possible either chemically ($Fe_3C$) or physically and it would be desirable if part of the iron oxide dust produced in the oxygen steelmaking vessel were also held to as great an extent as possible by the bed. However, carbon and iron oxide carried through the bed and pre-heating step can be caught in the dust collection system and returned to the bed in agglomerated form, such as briquettes. The rich reducing gas at an appropriate temperature passed through such a bed should remove at least 80% of the oxygen of the entering iron ore and perhaps more probably about 85%. Should the quantity of reducing gases be insufficient as produced according to the method outlined above to supply all the gas volume needs of the reduction step, then additional gas could be cheaply prepared by the additional combustion of additional hydrocarbon and oxygen in the same zone where the original injection is made. Pre-heating and pre-cracking the injected gas would also increase the volume of reducing gas produced. Any ethylene or related hydrocarbon may pass through the moving bed without appreciable reaction and could be recovered, if desired, by cryogenic or other means before the combustion of the top gases in the pre-heating step.

It is another object of this invention to provide at least enough cracked carbon held by the material in the moving bed to react at a later stage in the steelmaking vessel with the oxygen still remaining unreduced in the product of the bed (at the most 20% of the oxygen of the feed ore). It may be desirable to operate the process in such a way that all the thermal requirements of the subsequent oxygen steelmaking step can be supplied by excess free or chemically combined carbon held in the hot moving bed product or from briquettes produced from carbon removal from the gases in the dust collection systems. These briquettes and coke added at the top of the moving bed to improve its operating characteristics would also be available to produce energy in the steelmaking vessel and would, of course, be pre-heated to the moving bed temperature. An oxygen steelmaking vessel could thus be operated, completely on a feed consisting of concentrated but not agglomerated coarse iron oxide by means of the technique described of injecting the hydrocarbon into the gases issuing from the steelmaking vessel. Such a process offers very attractive economic possibilities because of the low energy requirement which results primarily from the effective use of the converter gases for iron reduction and because iron oxide in the agglomerated form may not be required. Nonetheless, there is no reason in the process suggested that hot metal and scrap should not be used in the oxygen steelmaking vessel should it be desirable.

The invention is illustrated by way of example in the accompanying drawing, the single figure of which is a flow diagram.

The following example gives an energy and mass balance calculation which shows that both the energy consumption and the capital required for carrying out the process according to the present invention are attractively low.

*Gas requirement for moving bed reduction step*

For the case where the reducing gas consists of ⅔ $H_2$ and ⅓ $CO$, to produce 1 atomic weight of iron requires about 2.8 moles of reducing gas (St. Pierre's Calculation).

It will be assumed that 85% of the oxygen of the feed ore is removed in the shaft; thus the oxygen remaining equals 0.225 atoms of oxygen/atom Fe. The quantity of CO and $CH_4$ required to produce 2.8 moles of $H_2+CO$ of prescribed ratio is 0.93 moles of each gas.

Although the $CH_4$ is not necessarily all dissociated, it is assumed for the present calculation that the dissociation of $CH_4$ is complete, and that all the carbon produced as a solid is trapped in the moving bed either as $Fe_3C$ or as physically caught material.

*Carbon requirements of steelmaking vessel*

Direct reduction—remove remainder of unreduced oxygen—0.225 At.C/At.Fe.
Carbon for steel produced—less than 0.001 At.C/Fe
∴ carbon left for oxidation with oxygen gas equals 0.93 less 0.226 or 0.70 At.C/At.Fe.

*Calculation of cooling effect of $CH_4$ injection*

Assume final temperature of 900° C. required $$CH_4 \rightarrow C+2H_2$$

ΔH° room temperature, cal./mole _____ =+17,889
Enthalpy to 900° C. for carbon (including allowance for information of the carbide) __  + 7,780
Hydrogen _____  +12,808
                                          _____
Total cooling energy, cal./mole $CH_4$__  +38,477

Energy available in cooling CO from 1600° C. to 900° C.=5,800 cal./mole.
Thus, maximum quantity of $CH_4$ that can be dissociated is $$\frac{5,800}{38,477} \text{ or } 0.14 \text{ moles } CH_4/\text{mole } CO$$

To produce extra dissociated $CH_4$ over and above that allowed by the enthalpy change in CO extra energy is required.

Extra quantity required=0.93–0.14 or 0.79 moles/At.Fe.

This requires 0.79×38,477 or 30,000 cal./At.Fe which is the ideal extra energy requirement.

*Energy available in steelmaking vessel from oxidation of excess carbon*

Reaction according to C+O→CO, and from above 0.70 mole of carbon available/At.Fe.
Energy available ~28,000 cal./mole.
Thus heat released=28,000×.70=19,600 cal.

*Energy requirement of steelmaking vessel*

Direct reduction—0.225×36,000=+8,100 cal./At.Fe.
(According to FeO+C=Fe+CO at 900° C.
ΔH°=+36,000 cal./mole)
Sensible heat requirement:

|  | Cal. |
|---|---|
| For Fe—1 Atom | 8,370 |
| Gangue—about | 1,000 |
| CO—0.225×6,000—about | 1,000 |
|  | _____ |
| About | 11,000 |

So total theoretical heat requirement is 8000+11,000 or about 20,000 cal./At.Fe.
This compares with energy available of 19,600 cal./At.Fe. or an approximate balance.

*Overall process energy requirement per ton of steel*

$CH_4$—0.93 mole/At.Fe.
Oxygen Gas—0.35 mole/At.Fe.

Extra energy to dissociate $CH_4$—30,000 cal./At.Fe. Per 2000 lb. steel:

$$CH_4 - \frac{.93 \times 359}{56} \times 2000 = 12,000 \text{ ft.}^3$$

$$\text{Extra energy} - \frac{30,000 \times 453.6}{252 \times 56} \times 2000 = 1,900,000 \text{ B.t.u.}$$

$$\text{Oxygen} - \frac{.35 \times 359 \times 2000}{56} = 4,500 \text{ ft.}^3$$

Approximate theoretical no-loss perfect process energy cost:

For $CH_4$—12,000 × $.50/1000 per cu.ft. _____ =$6.00
For $O_2$—at $10/ton _____ = 2.00
For extra energy at $.50/1,000,000 B.t.u. _____ = 1.00
                                                  ____
                                                  $9.00

These requirements would be increased to allow for losses and incomplete dissociation of $CH_4$. However, in the case of incomplete dissociation of $CH_4$, a valuable by-product such as ethylene may be available. No acount has been taken in this calculation of the energy requirement of the pre-heating step but the extra energy needed, if any, over and above that available in the gases leaving the moving reduction bed is likely to be very small.

These requirements would be decreased:
(1) If less reducing gas per unit of iron was required for the moving bed reduction step;
(2) If a higher degree of reduction was achieved in the reduction step;
(3) If some free carbon from, for example, coke could be tolerated by reason of low-sulphur content;
(4) If the moving bed reactor ran colder; and
(5) If a hydrocarbon with a higher carbon to hydrogen ratio was used such as naphtha in place of methane.

The proposed process assumes perfect operation of the oxygen steelmaking unit. In practice some $CO_2$ is always present in the leaving gases, and this will lead to extra energy requirements.

This injection step is also applicable to oxygen-using steelmaking processes of the types wherein the hot effluent gases consist mostly of $CO_2$ and $H_2O$. A different energy calculation is required than the one given above.

As previously indicated the carbon dust caught in the dust collector system would be sulfur-free and it would be advantageous to agglomerate it and return it to the moving carbon bed.

It may be advantageous to add a de-sulphurizer such as iron, iron oxide or lime in the injection chamber since some sulphur is present in natural gas or petroleum distillates. A catalyst to encourage the dissociation such as iron or iron oxide and other materials could also be added to this zone.

It is advantageous to dissolve a maximum quantity of carbon into the metallic iron produced in the reduction step since heat is absorbed during the solution of carbon into iron and the lower the temperature this reaction is carried out the better the thermochemical results.

I claim:

1. A process for reducing iron ore utilizing the exhaust gases from an oxygen steel making converter comprising the steps of injecting into said exhaust gases a hydrocarbon causing cooling of said exhaust gases and appreciable dissociation of the injected hydrocarbon to form a rich reducing gas, providing a bed of particulate iron oxide, and passing the said reducing gas through said bed to reduce said iron oxide.

2. A process for producing steel directly from iron ore utilizing the exhaust gases from an oxygen steel making converter for reducing the iron ore, comprising the steps of injecting into said exhaust gases a hydrocarbon causing cooling of said exhaust gases and appreciable dissociation of the injected hydrocarbon to form a rich reducing gas, providing a bed of particulate iron oxide, and passing the said reducing gas through said bed to produce a reduced and preheated feed to the oxygen converter.

3. A process as defined in claim 2, including a step of preheating the iron oxide.

4. A process for reducing iron ore utilizing the exhaust gases from an oxygen steel making converter comprising the steps of injecting into said exhaust gases a hydrocarbon selected from the group consisting of natural gas and naptha causing cooling of said exhaust gases and appreciable dissociation of the injected hydrocarbon to form a rich reducing gas comprising largely carbon monoxide and hydrogen, providing a downwardly moving bed of particulate iron oxide, and passing said reducing gas upwardly through said bed to reduce said iron oxide.

5. A process for producing steel directly from iron ore utilizing the exhaust gases from an oxygen steel making converter for reducing the iron ore, comprising the steps of injecting into said exhaust gases a hydrocarbon selected from the group consisting of natural gas and naptha causing cooling of said exhaust gases and appreciable dissociation of the injected hydrocarbon to form a rich reducing gas comprising largely carbon monoxide and hydrogen, providing a downwardly moving bed of particulate iron oxide, and passing the said reducing gas upwardly through said bed to produce a reduced and preheated feed to the oxygen converter.

6. A process as defined in claim 5 including the further step of controlling the proportion of injected hydrocarbon to adjust the temperature of the reducing gas for iron reduction.

7. A process as defined in claim 5, in which the downwardly moving bed of iron oxide comprises preheated iron oxide in pellet form.

8. A process as defined in claim 5, and further including the step of injecting with said injected hydrocarbon predetermined amounts of oxygen with additional hydrocarbon to increase the amount of reducing gas formed.

9. A process as defined in claim 5, including a step of recovering partly combusted gas from the region above the bed and combusting this recovered gas to at least partly preheat the iron oxide.

10. A process as defined in claim 5, including a further step of adding a predetermined amount of limestone to said moving bed for subsequent use in the making of steel.

11. A process as defined in claim 5, in which the reducing gas further comprises unsaturated hydrocarbons, and further including the step of removing desirable components of said unsaturated hydrocarbons.

12. A process as defined in claim 5, and further including the step of adding coke to the moving bed to provide added energy and control the bed condition.

13. A process as defined in claim 5 in which the reducing gas further comprises particles of solid carbon, and further including the steps of collecting and agglomerating the solid carbon particles, and adding the briquetted carbon particles to the moving bed to provide added energy and to control the bed condition.

14. A process as defined in claim 5 and further including the step of preheating and pre-cracking the injected hydrocarbon prior to injection.

15. A process as defined in claim 5, in which liquid pig iron is added to the converter periodically.

16. A process as defined in claim 5 in which scrap is added to the converter periodically.

17. A process as defined in claim 1 in which the hydrocarbon is in gaseous form.

18. A process as defined in claim 1 wherein the injection step takes place inside a steelmaking vessel whereby the injected gas serves as a cooling gas curtain and the iron oxide constitutes a catalyst for the dissociation reaction.

19. A process as defined in claim 1 wherein the product of the reduction bed contains sufficient carbon in the form of iron carbide ($Fe_3C$) in amounts at least equivalent to the residual oxygen held as iron oxide (FeO) to allow rapid solution and almost instantaneous reaction in a steelmaking converter.

References Cited

UNITED STATES PATENTS

| | | | |
|---|---|---|---|
| 2,855,290 | 10/1958 | Freeman | 75—33 |
| 3,163,521 | 12/1964 | Rinesch | 75—38 X |
| 3,215,523 | 11/1965 | Richardson | 75—60 |
| 3,282,677 | 11/1966 | Futakuchi et al. | 75—33 |
| 3,301,661 | 3/1967 | McGlynn et al. | 75—60 X |

DAVID L. RECK, *Primary Examiner.*

N. P. BULLOCH, H. W. TARRING, *Assistant Examiners.*